US012234534B2

(12) United States Patent
Komuro et al.

(10) Patent No.: US 12,234,534 B2
(45) Date of Patent: Feb. 25, 2025

(54) SINTERED MAGNET AND PRODUCTION METHOD FOR SINTERED MAGNET

(71) Applicant: Hitachi, Ltd., Tokyo (JP)

(72) Inventors: Matahiro Komuro, Tokyo (JP); Yuichi Satsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 879 days.

(21) Appl. No.: 17/259,253

(22) PCT Filed: Mar. 8, 2019

(86) PCT No.: PCT/JP2019/009396
§ 371 (c)(1),
(2) Date: Jan. 11, 2021

(87) PCT Pub. No.: WO2020/026501
PCT Pub. Date: Feb. 6, 2020

(65) Prior Publication Data

US 2021/0272727 A1 Sep. 2, 2021

(30) Foreign Application Priority Data

Jul. 31, 2018 (JP) ................................ 2018-143675

(51) Int. Cl.
*C22C 38/00* (2006.01)
*B22F 3/00* (2021.01)
(Continued)

(52) U.S. Cl.
CPC .............. *C22C 38/005* (2013.01); *B22F 3/00* (2013.01); *B22F 3/24* (2013.01); *H01F 1/0577* (2013.01);
(Continued)

(58) Field of Classification Search
CPC ... C22C 38/00; C22C 38/005; C22C 2202/02; H01F 1/0575; H01F 1/0577
See application file for complete search history.

(56) References Cited

U.S. PATENT DOCUMENTS 5,720,828 A 2/1998 Strom-Olsen
2010/0079024 A1 4/2010 Komuro
2018/0082772 A1* 3/2018 Okawa .................. C22C 38/005

FOREIGN PATENT DOCUMENTS

JP S61-208806 A 9/1986
JP H08-500939 A 1/1996
(Continued)

OTHER PUBLICATIONS

International Search Report with English translation and Written Opinion issued in corresponding application No. PCT/JP2019/009396 dated May 21, 2019.

*Primary Examiner* — Venessa T. Luk
(74) *Attorney, Agent, or Firm* — Foley & Lardner LLP

(57) ABSTRACT

Provided are: a sintered magnet having an improved maximum energy product while maintaining the magnetic coercivity of the magnet; and a production method for such a sintered magnet. The sintered magnet (10*a*) according to the present invention comprises particles (6) each including: a main phase (2) in which the main component is a compound containing a rare-earth element and iron; and a diffusion layer (1) provided on the surface of the main phase (2). The diffusion layers (1) are characterized by: containing, as a main component, a compound resulting from a solid-solution of carbon and/or nitrogen in said compound of the main phase (2); and having a concentration gradient of carbon and/or nitrogen from the surfaces of the particles (6) toward the interior thereof.

7 Claims, 4 Drawing Sheets

(51) Int. Cl.
*B22F 3/24* (2006.01)
*H01F 1/057* (2006.01)
*H01F 41/02* (2006.01)

(52) U.S. Cl.
CPC .... *H01F 41/0253* (2013.01); *B22F 2003/248* (2013.01); *B22F 2998/10* (2013.01); *C22C 2202/02* (2013.01)

(56) References Cited

FOREIGN PATENT DOCUMENTS

| | | | | |
|---|---|---|---|---|
| JP | 2012-044203 A | | 3/2012 | |
| JP | 2012-204823 A | | 10/2012 | |
| JP | 2013-098447 A | | 5/2013 | |
| WO | WO-2016153057 A1 | * | 9/2016 | ................ B22F 3/16 |

* cited by examiner

SINTERED MAGNET AND PRODUCTION METHOD FOR SINTERED MAGNET

TECHNICAL FIELD

The present invention relates to a sintered magnet and a method for producing a sintered magnet.

BACKGROUND ART

Permanent magnets using rare-earth elements include a neodymium permanent magnet, a samarium-cobalt permanent magnet, or the like. Since the rare-earth elements are used in these permanent magnet materials, a technique has been developed that can reduce a use amount of the rare-earth elements from the viewpoints of resource stability, resource security assurance, and price stability.

On the other hand, the larger the maximum energy product, the higher the performance of the permanent magnet, and when the maximum energy product can be increased, a magnet volume used in various applied products can be reduced. The permanent magnet having the highest maximum energy product in a temperature range of 20° C. to 200° C. is a neodymium magnet. When a material process capable of increasing the maximum energy product of the neodymium magnet is established, the use amount of the magnets can be reduced and a product can be made smaller and lighter in addition to resource conservation.

A sintered magnet using a rare-earth is disclosed in, for example, PTL 1 below. PTL 1 discloses a sintered magnet that is a rare-earth-iron-boron-based sintered magnet including: a main phase crystal grain; and a crystal grain boundary portion surrounding the main phase crystal grain, in which a concentration of fluorine is higher in a region near a surface of the magnet than in a center of the magnet, a concentration of one metal element selected from elements of Group 2 to Group 16 other than the rare-earth elements, carbon and boron is higher in the region near the surface of the magnet than in the center of the magnet, a carbonic fluoride containing Dy and the metal element is formed in the crystal grain boundary portion in a region where a distance from the surface of the magnet is 1 μm or more, and a concentration of carbon is higher than the concentration of the metal element in a region where the distance from the surface of the magnet is 1 μm to 500 μm.

CITATION LIST

Patent Literature

PTL 1: JP-A-2012-44203

SUMMARY OF INVENTION

Technical Problem

When attempting to increase the maximum energy product of the permanent magnet in the related art, there is a problem that a coercive force decreases. It is also desirable to develop a sintered magnet in which the coercive force and the maximum energy product of the magnet are further improved than that in PTL 1 described above.

An object of the invention is to provide a sintered magnet having an improved maximum energy product while maintaining the coercive force of the magnet and a method for producing a sintered magnet.

Solution to Problem

According to an aspect of the invention for achieving the above object, there is provided a sintered magnet that contains a grain including: a main phase containing, as a main component, a compound containing a rare-earth element and iron; and a diffusion layer provided on a surface of the main phase. The diffusion layer contains, as a main component, a compound resulting from solid-solution of at least one of carbon and nitrogen in the compound of the main phase. In the sintered magnet, at least one of carbon and nitrogen exhibits a concentration gradient from a surface toward an interior of the grain.

According to another aspect of the invention, there is provided a method for producing a sintered magnet that includes: a step of preparing a sintered body containing a grain containing, as a main component, a compound containing a rare-earth element and iron; and a carbon or nitrogen diffusion step of diffusing at least one of carbon and nitrogen into the sintered body. In the carbon or nitrogen diffusion step, at least one of carbon and nitrogen is diffused into a compound constituting a surface of the sintered body, and a diffusion layer containing, as a main component, a compound resulting from solid-solution of at least one of carbon and nitrogen in the compound is formed on surfaces of the grains.

A more specific configuration of the invention is described in claims.

Advantageous Effect

According to the invention, it is possible to provide a sintered magnet having an improved maximum energy product while maintaining a coercive force of the magnet and a method for producing a sintered magnet.

Problems, configurations and effects other than those described above will be clarified by description of the following embodiments.

DESCRIPTION OF EMBODIMENTS

Hereinafter, embodiments of the invention will be described with reference to the accompanying drawings. However, the invention is not limited to the embodiments described here, and various combinations and improvements can be made without departing from the scope of the invention.

[Sintered Magnet]

Figure 1:
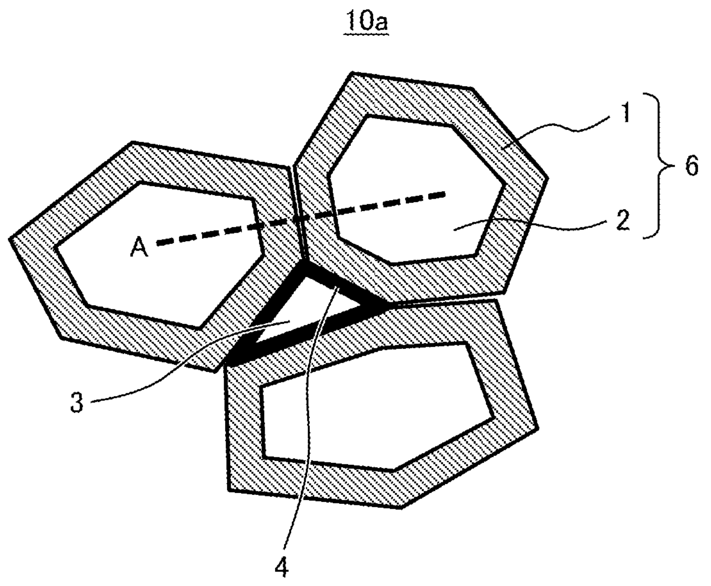
FIG. 1 is a schematic diagram showing an example of a structure of a sintered magnet according to the invention.

FIG. 1 is a schematic diagram showing an example of a structure of a sintered magnet according to the invention. As shown in FIG. 1, a sintered magnet 10*a* according to the invention includes: grains 6 each including a main phase 2 containing, as a main component, a compound containing a rare-earth element and iron (Fe); and a diffusion layer 1 provided on a surface of the main phase 2. The diffusion layer 1 contains, as a main component, a compound resulting from solid-solution of at least one of carbon (C) and nitrogen (N) in the compound of the main component of the main phase 2. That is, the compound resulting from the solid-solution of at least one of C and N in the main phase is formed along grain boundaries 4.

For example, when the main phase 2 contains, as the main component, a compound $Nd_2Fe_{14}B$, the main component of the diffusion layer 1 can be expressed as $Nd_2Fe_{14}(B,C)$, $Nd_2Fe_{14}(B,N)$, and $Nd_2Fe_{14}(B,C,N)$. Then, at least one of C and N which is solid-solubilized in the main phase 2 exhibits a concentration gradient from a surface toward an interior of the grain 6 of the sintered magnet 10*a*. Here, the surface of the grain 6 is assumed to mean an interface between the grain 6 and the crystal grain boundary (boundary between adjacent grains) 4.

In the invention, since C or N exhibits a concentration gradient from the surface toward the interior of the grain 6, (1) an increase in crystal magnetic anisotropy energy, (2) an increase in magnetic transformation point, and (3) an increase in saturation magnetic flux density and residual magnetic flux density can be realized. When the crystal magnetic anisotropy energy is increased, a coercive force of a permanent magnet is improved. When the magnetic transformation point is increased, a heat resistance temperature of the permanent magnet is increased. When the saturation magnetic flux density and the residual magnetic flux density are increased, a maximum energy product of the permanent magnet is improved.

In a case of a neodymium sintered magnet, it is necessary to reduce a use amount of a heavy rare-earth element added to ensure heat resistance so as to increase the maximum energy product. However, so far, the heavy rare-earth element is added to increase the heat resistance temperature, but the maximum energy product is sacrificed. An inexpensive method for increasing both the coercive force and the residual magnetic flux density or increasing both the heat resistance and the maximum energy product has not been disclosed yet.

In the invention, it is possible to maintain the coercive force and increase the maximum energy product or maintain the coercive force and increase the maximum energy product with an inexpensive material. That is, at least one of C and N is diffused from the surface to the interior of the grain of the sintered magnet, and these elements are unevenly distributed in a vicinity of the grain boundaries of the grains.

A concentration of at least one of C and N in the diffusion layer 1 is preferably 2 at % or more and 10 at % or less. When the diffusion layer 1 contains both C and N, a combined concentration thereof is preferably 2 at % or more and 10 at % or less. When the concentration is less than 2 at %, the effects (1) to (3) described above cannot be sufficiently obtained. When the concentration is more than 10 at %, a non-magnetic rare-earth carbide or rare-earth nitride is more likely to be formed, and the coercive force and the residual magnetic flux density (energy product) is decreased.

A film thickness of the diffusion layer 1, that is, a diffusion distance of C and N is preferably 1 nm or more and 500 nm or less. When the film thickness is more than 500 nm, crystallinity of the main phase decreases, and magnetic properties deteriorate. When the film thickness is less than 1 nm, the effect of improving the magnetic properties cannot be sufficiently obtained.

The main component of the main phase 2 of the sintered magnet according to the invention is preferably $R_2Fe_{14}B$ or $RFe_{12}$ (R is a rare-earth element). As long as a crystal structure is maintained, a part of Fe may be substituted with cobalt (Co). In a case of $R_2Fe_{14}B$, C and N are substituted with B. In addition, in a case of $RFe_{12}$, C and N enter an interstitial site in a crystal lattice.

When the main component of the main phase 2 is $R_2Fe_{14}B$, a ratio X/Y of a concentration X of C or N to a concentration Y of boron B in the diffusion layer 1 is preferably 0.1 or more and 10 or less based on an atomic mass. When X/Y is more than 10, a Curie point starts to decrease. When X/Y is less than 0.1, the effect of increasing the maximum energy product is not sufficient.

Figure 2:
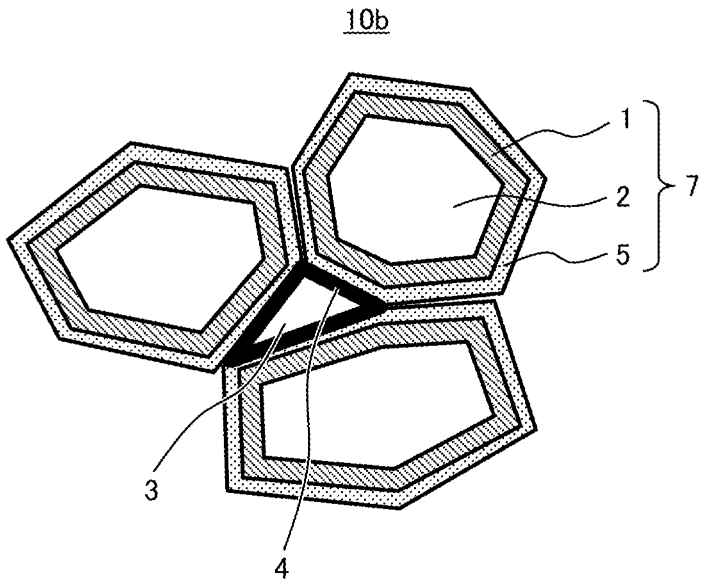
FIG. 2 is a schematic diagram showing another example of the structure of the sintered magnet according to the invention.

FIG. 2 is a schematic diagram showing another example of the structure of the sintered magnet according to the invention. A sintered magnet 10*b* shown in FIG. 2 further contains a surface layer 5 on a surface of the diffusion layer 1. The surface layer 5 has a composition in which a compound having a rare-earth element concentration lower than that in $R_2Fe_{14}B$ where a ratio (R:Fe) of R to Fe is 2:14, such as an $R_2Fe_{17}$-based compound or an $RFe_{12}$-based compound, contains at least one of C and N. Such a configuration can increase the maximum energy product without reducing the heat resistance of the sintered magnet.

[Method for Producing Sintered Magnet]

Figure 8:
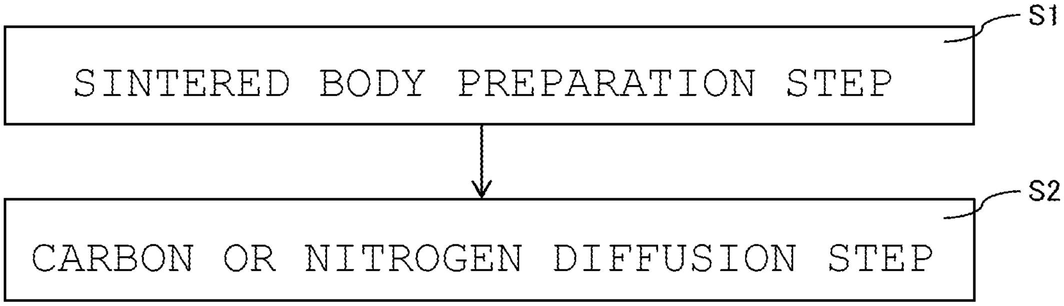
FIG. 8 is a flow chart showing an example of a method for producing a sintered magnet according to the invention.

FIG. 8 is a flow chart showing an example of a method for producing a sintered magnet according to the invention. As shown in FIG. 8, the method for producing a sintered magnet according to the invention includes a step (S1) of preparing a sintered body and a step (S2) of diffusing C or N into the sintered body.

In the sintered magnet preparation step (S1), the sintered body having a composition of the main phase 2 described above is prepared. In the step (S2) of diffusing C or N into the sintered body, at least one of carbon and nitrogen is diffused into the compound constituting the surface of the sintered magnet, and the diffusion layer containing, as a main component, a compound resulting from solid-solution of at least one of carbon and nitrogen is formed on the surface of the grain.

As the step (S2) of diffusing C or N, for example, a gas serving as a supply source of C or N is supplied to the sintered body, and is subjected to a heat treatment. The supply source of C is preferably a gas represented by $C_xH_y$ (x and y are positive integers), and the supply source of N is preferably nitrogen ($N_2$) or ammonia ($NH_3$). As $C_xH_y$, acetylene ($C_2H_2$) and $C_2H_4$ (ethylene) can be used, and $C_2H_2$ is particularly preferred. Since $C_2H_2$ has a strong reduction power and is a highly reactive gas, a larger amount of C can be diffused in the compound than other gases. It is preferable that the supply source of C or N does not contain oxygen (O) so as not to oxidize the sintered body.

A preferred temperature in the heat treatment depends on a composition of a liquid phase. That is, it is necessary to select an optimum temperature depending on the composition of the sintered body. For example, when a formation temperature of the liquid phase is 500° C., the treatment temperature can be set to 500° C. or higher. When the formation temperature of the liquid phase is 400° C. or higher and 800° C. or lower, C or N can be diffused to the grain boundary.

When the treatment temperature is higher than 800° C., an amount of the liquid phase is increased and a diffusion coefficient is also increased, so that a carbon concentration at a center of the grain boundary is increased. Therefore, a width of a carbon-substituted phase along the grain boundary from the center of the grain boundary is increased, and a rare-earth carbide is likely to grow. Therefore, the concentration of the rare-earth element in the main phase is reduced, and a soft magnetic component is likely to grow. A more preferred treatment temperature is 750° C. By performing the treatment at such a temperature, as shown in FIGS. 1 and 2, the diffusion layer 1 can be formed after a part of the main phase 2 is substituted with C or N.

During the heat treatment, the gas serving as the supply source of C or N is preferably intermittently supplied at a predetermined time. When the gas serving as the supply source of C or N is caused to continuously flow, a carbide grows on the surface, making it difficult for diffusion to proceed. Therefore, the gas is supplied by being divided into a pulse shape, which allows alternate repeating of penetration and diffusion of C or N and allows C or N to diffuse along the grain boundaries to an interior of the sintered body. In a case of $C_2H_2$, it is desirable that a time ratio between the carburizing and the diffusion is preferably such that a diffusion time is equal to or longer than a carburizing time.

In the technique described in PTL 1, carbon diffuses from an organic solvent to the sintered magnet, and an amount of carbon is less than 1 at % at a layer 0.5 mm from a surface or at a layer 1 mm from the surface (FIGS. 1 to 6), and is less than half of a concentration (2 at % to 10 at %) of at least one of C and N in the diffusion layer 1 according to the invention. In the production method described in PTL 1, a compound obtained by substituting a part of B in the main phase with at least one of C and N does not have a structure formed along the grain boundaries 4.

Further, even when a carbon source is mixed during the sintering of the sintered magnet, a configuration of the sintered magnet according to the invention as shown in FIG. 1 is not obtained. The sintered magnet is usually prepared by performing liquid phase sintering by heating at about 1000° C., but when the carbon source is mixed during the liquid phase sintering, the sintering of the magnet is hindered, and a compound having the composition of the sintered magnet is not obtained.

EXAMPLES

Hereinafter, the invention will be described in more detail based on Examples.

Example 1

In the present example, an experiment was conducted in which $C_2H_2$ was used as the supply source of C and carbon was diffused into the sintered body constituting the main phase. As the sintered body constituting the main phase, $Nd_2Fe_{14}B$ (sample No. 1), $(Nd,Pr)_2Fe_{14}B$ (sample No. 2), $(Nd\ Pr,Dy)_2Fe_{14}B$ (sample No. 3), $NdFe_{12}$ (sample No. 4), and $YFe_{12}$ (sample No. 5) were prepared. A carburizing furnace was used for diffusion of carbon. As the carburizing furnace, a device including three chambers, i.e., an introduction chamber, a treatment chamber, and a cooling chamber for the sample was used.

First, the No. 1 sintered body was placed in the introduction chamber and the introduction chamber was vacuum-evacuated. An ultimate vacuum of the carburizing furnace is $1\times10^{-4}$ Pa. After the vacuum-evacuation, an inside of the furnace was substituted with argon (Ar) gas to exhaust residual oxygen and residual steam. After the vacuum-evacuation and Ar gas substitution were repeated a plurality of times, the sintered body was moved to the treatment chamber. The treatment chamber was heated in advance and controlled to be in a range of 750° C.±5° C. in a soaking zone. A heating rate for heating the treatment chamber was 5° C./sec.

When the inside of the treatment chamber reached 750° C., $C_2H_2$ and Ar gas were each caused to flow in a pulse shape. That is, a time for flowing $C_2H_2$ was divided into a pulse shape. In the present example, the gas was caused to flow for 3 minutes, then stopped for 3 minutes, and only Ar was caused to flow. Next, $C_2H_2$ was caused to flow for 3 minutes, and only Ar was caused to flow again for 3 minutes. Supply of $C_2H_2$ for 3 minutes and supply of Ar for 3 minutes were repeated three times, and finally, after $C_2H_2$ was caused to flow for 1 minute, the sintered body was moved to the cooling chamber and cooled by spraying Ar. A maximum cooling rate at this time was 10° C./sec to 20° C./sec.

After cooling the sintered body to 100° C. or lower, the sintered body was heated to 500° C. using the same vacuum equipment as above, held for 2 hours, and then rapidly cooled with Ar gas. The sintered body was magnetized in an easy magnetization direction at a magnetic field of 40 kOe to produce a No. 1 sintered magnet. NO. 2 to No. 5 sintered magnets were produced in the same manner as the No. 1 sintered magnet. Configurations of the No. 1 to No. 5 sintered magnets, the maximum energy product (MGOe) of the sintered bodies before the diffusion step, and the maximum energy product (MGOe) of the sintered magnets after the diffusion step are described in Table 1.

Conditions of the carburizing treatment will be described. The carburizing treatment is performed at an ultimate vacuum of $1\times10^{-4}$ Pa, and at a vacuum of $1\times10^{-2}$ Pa or more, an oxygen content of a rare-earth rich phase at the grain boundary is increased on the surface of the sintered magnet because it is easily affected by oxidation and residual moisture. At such a high pressure vacuum, diffusion of carbon or nitrogen is not sufficient, and carbonization or nitridation of the surface of the sintered magnet proceeds.

When the heating rate is slower than 5° C./sec and falls below or equal to 1° C./sec, a part of the elements constituting the liquid phase of the grain boundaries may diffuse and move to the sintered surface, and the diffusion of carbon or nitrogen may be inhibited. Further, at high-speed heating of 100° C./sec or more, it is difficult to control diffusion because carbon or nitrogen comes into contact with a reactive gas such as acetylene before the liquid phase is sufficiently formed.

The structure of the produced No. 1 sintered magnet was observed with a scanning electron microscope (SEM), and had a structure shown in FIG. 1. That is, the diffusion layer 1, i.e., $Nd_2Fe_{14}(B,C)$, was formed on an outer peripheral side of a crystal grain of the main phase 2, i.e., $Nd_2Fe_{14}B$. A ratio of B to C is increased as the concentration of C was increased closer to the grain boundaries, and a ratio of C/B was about 1 at an interface in contact with the grain boundary.

As a result of composition analysis by energy dispersive X-ray spectrometry (EDX), a rare-earth carbide, an iron carbide, a rare-earth boron carbide, and an iron boron carbide were formed at a grain boundary triple point 3, and the concentration of carbon contained in the iron carbide, the rare-earth carbide, or an additive element observed at the grain boundary triple point 3 was higher than the concentration of carbon of the main phase.

Figure 3:
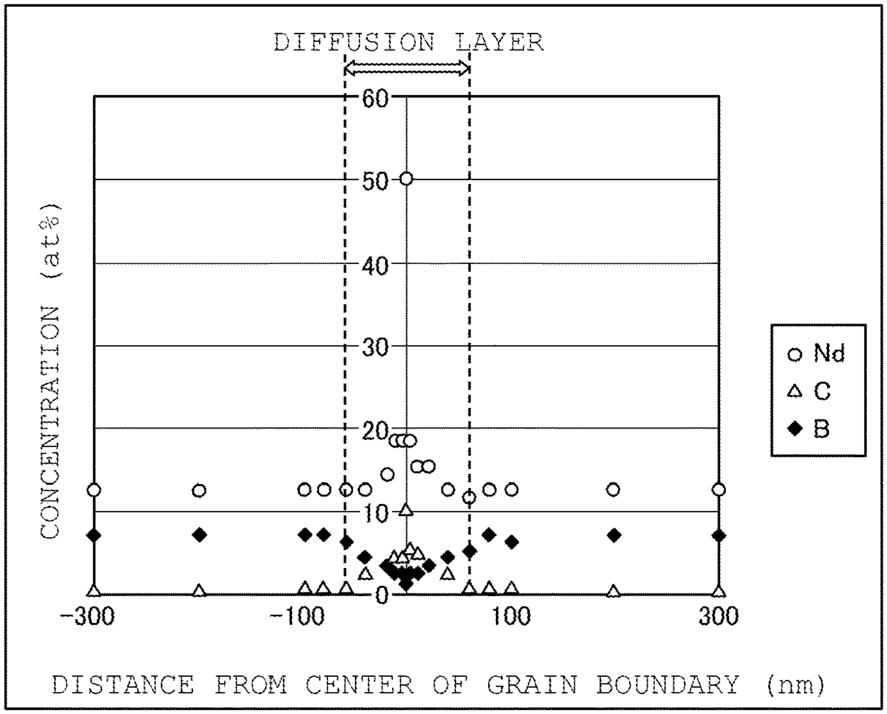
FIG. 3 is a graph showing concentration distributions of Nd, C and B in a sintered magnet as a sample No. 1.
Figure 4:
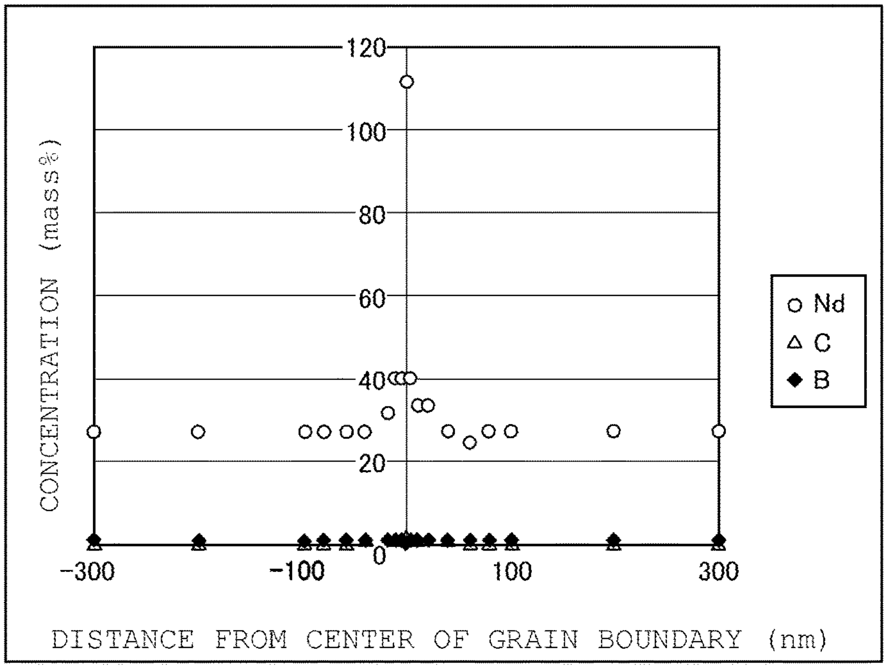
FIG. 4 is a graph showing the concentration distributions of Nd, C and B in the sintered magnet as the sample No. 1.
Figure 5:
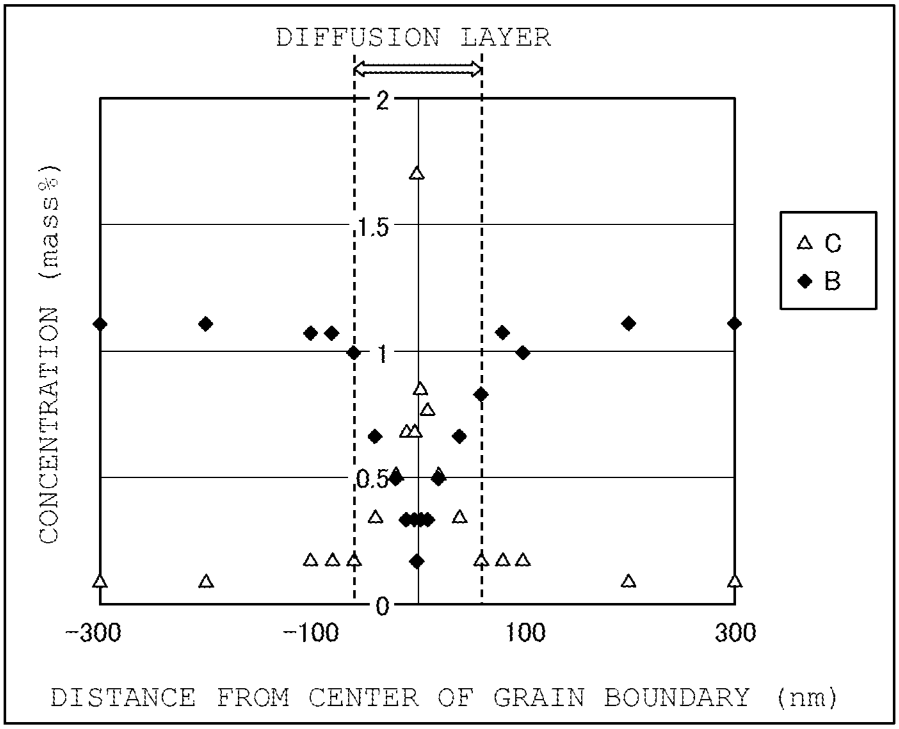
FIG. 5 is a graph showing the concentration distributions of Nd, C and B in the sintered magnet as the sample No. 1.
Figure 6:
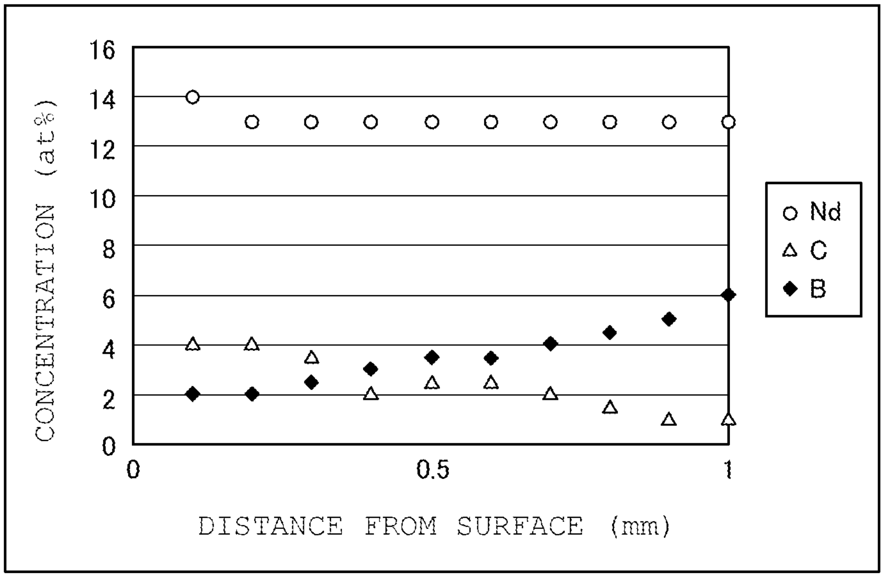
FIG. 6 is a graph showing the concentration distributions of Nd, C and B in the sintered magnet as the sample No. 1.

FIGS. 3 to 6 are graphs showing concentration distributions of Nd, C, and B in Example 1. FIG. 3 shows a concentration (unit: at %) in a vicinity of 300 nm from the center of the grain boundary. FIG. 4 shows a concentration (unit: mass %) in the vicinity of 300 nm from the center of the grain boundary. FIG. 5 is an enlarged view of FIG. 4. FIG. 6 shows a concentration (unit: at %) in the vicinity of 1 mm from the center of the grain boundary. FIGS. 3 to 6 show results of the composition analysis on the distribution of Nd, C and B in the vicinity (a line A part in FIG. 1) of the grain boundary of the No. 1 sintered magnet using SEM-EDX, and show the distribution of the composition measured in a direction perpendicular to the grain boundary between the grains shown by the line A.

As shown in FIGS. 3 to 6, a distance at which the concentration gradient of carbon was observed from the center of the grain boundary was 10 nm to 500 nm, and a distance where C has the concentration gradient, that is, a width of the main phase in which carbon was substituted, was thicker toward the surface of the sintered magnet. As shown in FIG. 3, it can be seen that the concentration (at %) of C is higher than that of B at a distance 20 nm from the center of the grain boundary. A region where a concentration ratio C/B is 1 or more in terms of atomic concentration is 20 nm from the center of the grain boundary. A depth (thickness) of the diffusion layer corresponds to a region to a depth at which the carbon concentration is almost constant, and is 60 nm from the center of the grain boundary in FIG. 3. A maximum concentration of C in the diffusion layer is 5 at % (0.9 mass %).

FIG. 6 shows results of the composition analysis for a sintered magnet having a size of 10×10×10 $mm^3$. An average value of the composition on a 10×10 $\mu m^2$ plane is shown. It can be seen that carbon diffuses from the surface to a depth of about 0.8 mm.

The maximum energy product of the obtained sintered magnet was measured by the following method. A direct current magnetic field is applied in a direct current magnetization measuring device. The magnetic field is measured with a Hall element and magnetization is measured with a sensor coil. A signal of the sensor coil is calibrated with Ni (nickel). The maximum energy product is calculated from a magnetization curve. The maximum energy products of the sintered magnets, as the samples No. 1 to No. 5, are also shown in Table 1 described later.

61 MGOe by forming the diffusion layer. By increasing the maximum energy product in this manner, a volume of the sintered magnet used in a magnetic circuit can be reduced. In addition, regarding the samples No. 2 to No. 5, it was confirmed that the maximum energy product was improved as the sample No. 1. In the sample No. 3, Dy, as a heavy rare-earth element, was unevenly distributed in the vicinity of the grain boundary.

The effect same as in the case of Dy uneven distribution was confirmed for a sample No. 8 (main phase: $(Nd,Pr)_2Fe_{14}B$) in which $C_2H_4$ was used as the supply source of carbon. That is, it was confirmed that regarding the gas having the composition $C_xH_y$ (x and y are positive integers), carbon can be introduced into the sintered body to substitute boron and carbon in the main phase. Further, it was confirmed that the samples No. 4 and No. 5, containing, as a main phase, a compound such as 1-12-based compound having a rare-earth element concentration than lower that of an $R_2Fe_{14}B$-based compound, also had the same effect of improving the maximum energy product as the sample No. 1.

Example 2

In the present example, an experiment was conducted in which $C_2H_2$ was used as the supply source of C, $N_2$ and $NH_3$ were used as the supply source of N, and carbon and nitrogen were diffused into the sintered body constituting the main phase (Nos. 6, 7, 9, 10). As the sintered body constituting the main phase, $(Nd,Pr)_2Fe_{14}B$ was prepared. The sintered body was placed in an introduction chamber of a heating furnace having the same configuration as that of the carburizing furnace according to Example 1, and the introduction chamber was vacuum-evacuated. An ultimate vacuum of the heating furnace is $5\times10^{-4}$ Pa. After the vacuum-evacuation, an inside of the furnace was substituted with $N_2$ gas to exhaust residual oxygen and residual steam. Next, the gas was substituted with $N_2$ gas and then exhausted. After the vacuum-evacuation and $N_2$ gas substitution were repeated, the sintered body was moved to the treatment chamber. The treatment chamber was heated in advance and controlled to be in a range of 750° C.±5° C. in a soaking zone. A heating rate for heating the treatment chamber was 5° C./sec.

TABLE 1

| Sample NO. | Treatment temperature (° C.) | Used gas | Configuration of grain of sintered magnet: Main phase | Configuration of grain of sintered magnet: Diffusion phase | Maximum energy product (MGOe) before diffusion step | Maximum energy product (MGOe) after diffusion step |
|---|---|---|---|---|---|---|
| 1 | 750 | $C_2H_2$ | $Nd_2Fe_{14}B$ | $Nd_2Fe_{14}(C, B)$ | 52 | 61 |
| 2 | | $C_2H_2$ | $(Nd, Pr)_2Fe_{14}B$ | $(Nd, Pr)_2Fe_{14}(B, C)$ | 54 | 62 |
| 3 | | $C_2H_2$ | $(Nd, Pr, Dy)_2Fe_{14}B$ | $(Nd, Pr, Dy)_2Fe_{14}(B, C)$ | 40 | 59 |
| 4 | | $C_2H_2$ | $NdFe_{12}$ | $NdFe_{12}C$ | 20 | 42 |
| 5 | | $C_2H_2$ | $YFe_{12}$ | $YFe_{12}C$ | 25 | 50 |
| 6 | | $C_2H_2$-5% $N_2$ | $(Nd, Pr)_2Fe_{14}B$ | $(Nd, Pr)_2Fe_{14}(C, B, N)$ | 52 | 64 |
| 7 | | $C_2H_2$-50% $N_2$ | $(Nd, Pr)_2Fe_{14}B$ | $(Nd, Pr)_2Fe_{14}(C, B, N)$ | 52 | 66 |
| 8 | | $C_2H_4$ | $(Nd, Pr)_2Fe_{14}B$ | $(Nd, Pr)_2Fe_{14}(C, B)$ | 52 | 59 |
| 9 | | $NH_3$ | $(Nd, Pr)_2Fe_{14}B$ | $(Nd, Pr)_2Fe_{14}(B, N)$ | 52 | 55 |
| 10 | | $NH_3$ + 50% $N_2$ | $(Nd, Pr)_2Fe_{14}B$ | $(Nd, Pr)_2Fe_{14}(B, N)$ | 52 | 54 |

As shown in Table 1, in the No. 1 sintered magnet, the maximum energy product was increased from 52 MGOe to When an inside of the treatment chamber reached 650° C., $C_2H_2$ and $N_2$ gas were each caused to flow in a pulse shape.

A time for flowing $C_2H_2$ was divided into a pulse-shaped time. In the present example, $C_2H_2$ was supplied for 5 minutes, then stopped for 5 minutes, and only $N_2$ was caused to flow. Next, $C_2H_2$ was supplied for 5 minutes, and only $N_2$ was supplied again for 5 minutes. Supply of $C_2H_2$ for 5 minutes and supply of $N_2$ for 5 minutes were repeated five times, and finally, after $C_2H_2$ was caused to flow for 1 minute, the sintered body was moved to the cooling chamber and cooled by spraying $N_2$. A maximum cooling rate was 10° C./sec to 20° C./sec.

After cooling the sintered body to 100° C. or lower, the sintered body was heated to 500° C. using the same vacuum equipment as above, held for 2 hours, and then rapidly cooled with $N_2$ gas. The sintered body was magnetized in the easy magnetization direction at a magnetic field of 40 kOe to produce the sintered magnet as the sample No. 6. Sintered magnets as samples Nos. 7, 9, and 10 were also produced in the same manner as the sintered magnet as the sample No. 6. Configurations of the Nos. 6, 7, 9 and 10 sintered magnets, maximum energy products (MGOe) of the sintered bodies before a diffusion step and the maximum energy products (MGOe) of the sintered magnets after the diffusion step were described in Table 1.

When the structure of the sintered magnet as the sample No. 6 was evaluated with an electron microscope, N was diffused into a part of the grain boundary by using a mixed gas of $C_2H_2$ and $N_2$, and $(Nd,Pr)_2Fe_{14}(C,B,N)$ was formed in the vicinity of the grain boundary. It is assumed that the concentration of C and N is increased from a center of a main phase crystal grain toward the grain boundary, and crystal magnetic anisotropy energy and a saturation magnetic flux density increase in the vicinity of the grain boundary.

As shown in Table 1, it was confirmed that, in the sintered magnet as the sample No. 6, the maximum energy product before the diffusion step, i.e., 52 MGOe, was increased to 64 MGOe.

Figure 7:
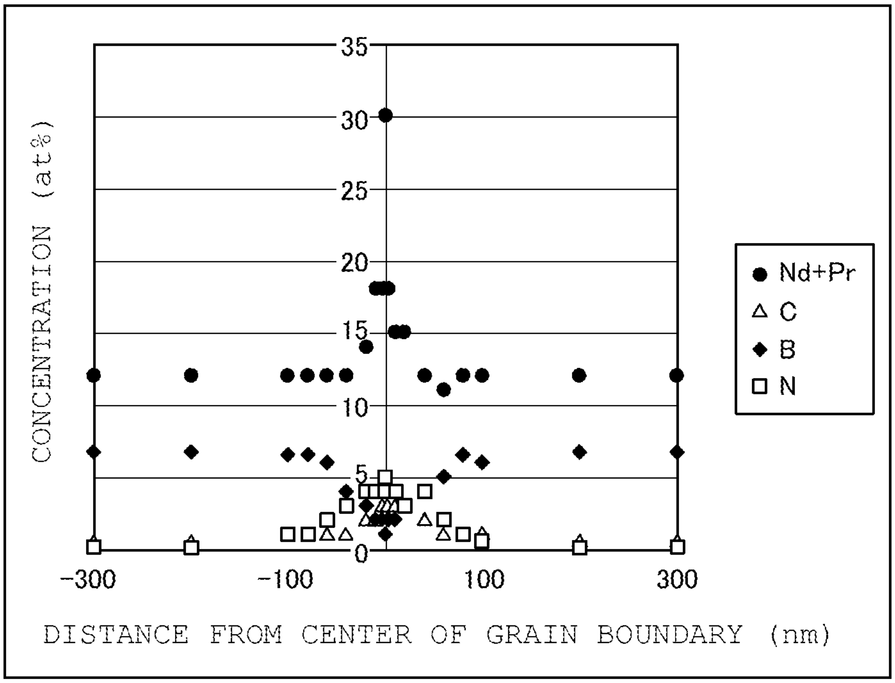
FIG. 7 is a graph showing concentration distributions of Nd, C and B in a sintered magnet as a sample No. 6.

FIG. 7 is a graph showing concentration distributions of Nd, C and B in the sintered magnet as the sample No. 6. FIG. 7 shows the composition distributions in the vicinity of the grain boundary between two crystal grains at about 300 nm from the surface of the sintered magnet in which $(Nd,Pr)_2Fe_{14}$ (C,B,N) is formed. N is diffused at a concentration higher than that of C at the grain boundary to a distance 80 nm from the center of the grain boundary. A diffusion width of N is about 200 nm to two sides from the center of the grain boundary.

As shown in Table 1, similar to the sample No. 6, the effect of improving the maximum energy product was also confirmed in the samples No. 7, No. 9, and No. 10. By increasing the maximum energy product in this way, it is possible to reduce the volume of the sintered magnet used in a magnetic circuit such as a motor, a generator, and a magnetic levitation apparatus.

Example 3

In the present example, a heat treatment in the diffusion step was performed using a high-frequency carburizing furnace (frequency: 100 kHz). Similar to the carburizing furnace according to Example 1, the high-frequency carburizing furnace has a three-chamber configuration, i.e., an introduction chamber, a treatment chamber, and a cooling chamber. First, $Nd_2Fe_{14}B$ was prepared as the sintered body constituting the main phase of the sintered magnet, and placed in the introduction chamber of the high-frequency carburizing furnace, and the introduction chamber was vacuum-evacuated. An ultimate vacuum of the high-frequency carburizing furnace is $1\times10^{-3}$ Pa. After the vacuum-evacuation, Ar gas was introduced into the furnace, and carburizing gas was introduced in a pulse shape while residual oxygen and residual steam were exhausted.

Next, the sintered body was moved to the treatment chamber. A configuration is included in which the vicinity of the surface of the sintered body is heated by energizing a high-frequency coil. An energization amount of the coil is controlled such that a temperature of the surface of the sintered body is in a range of 700° C.±5° C. A heating rate is 100° C./sec.

When the surface of the sintered body reached 700° C., $C_2H_2$ and Ar gas were each caused to flow in a pulse shape. A time for flowing $C_2H_2$ was divided into a pulse-shaped time. Specifically, after supply of $C_2H_2$ for 1 minute, the supply of $C_2H_2$ was stopped for 1 minute, and only Ar was supplied. Next, $C_2H_2$ was supplied for 1 minute, and only Ar was supplied again for 1 minute. The supply of $C_2H_2$ for 1 minute and the supply of Ar for 1 minute were repeated three times, and finally, $C_2H_2$ was caused to flow for 0.5 minutes, and then the sintered body was cooled by Ar. This cooling was performed by spraying Ar to the sintered body in a dedicated cooling chamber. A maximum cooling rate was 10° C./sec to 20° C./sec.

After cooling the sintered body to 100° C. or lower, the sintered body was heated to 500° C. using the same vacuum equipment as above, held for 2 hours, and then rapidly cooled with Ar gas. The sintered body was magnetized in the easy magnetization direction at a magnetic field of 40 kOe to obtain the sintered magnet according to Example 3.

At high-speed heating at 100° C./sec or higher using a high frequency, the diffusion of a reactive gas such as $C_2H_2$ is accelerated by the high frequency, so that the diffusion depth can be easily controlled. In addition, in a case of high-frequency heating, since the surface is heated by an eddy current, deterioration due to grain growth or liquid phase growth in a center of the sintered body is small.

The structure of the sintered magnet produced in the present example was evaluated with an electron microscope, and has a structure shown in FIG. 2. That is, the diffusion layer 1, i.e., $Nd_2Fe_{14}(B,C)$ was formed on an outer peripheral side of a crystal grain of the main phase 2, i.e., $Nd_2Fe_{14}B$, and the surface layer 5, i.e., $Nd_2Fe_{17}(B,C)$ was formed on an outer periphery side of the diffusion layer 1. The ratio of B to C was increased as the concentration of C is increased closer to the grain boundary, and a ratio of C/B was about 1 at an interface in contact with the grain boundary.

A rare-earth carbide, an iron carbide, a rare-earth boron carbide, and an iron boron carbide were formed at the grain boundary triple point 3. As shown in the figure, $Nd_2Fe_{14}$(B, C) and $Nd_2Fe_{17}(B,C)$ were formed on the outer peripheral side of the crystal grain, and a concentration gradient of the carbon concentration was observed from the center of the grain boundary to the center of the grain. A distance at which the concentration gradient was observed from the center of the grain boundary was 10 nm to 500 nm, and the distance where C has the concentration gradient, that is, a width of the main phase in which carbon was substituted, was thicker toward the surface of the sintered magnet.

As in the present example, an $RE_2Fe_{14}B$-based (RE is at least one type of rare-earth element) sintered magnet in which $RE_2Fe_{14}B$ is the main phase, is carburized, and thereby a carbon-containing rare-earth compound having an iron concentration higher than that of the main phase can be formed at the grain boundary and in the vicinity of the grain boundary. The carbon-containing rare-earth compound is a compound having a rare-earth element concentration in a concentration range of 3 at % to 10 at % and a carbon concentration of 5 at % to 10 at %.

The sintered magnet produced in the present example can achieve both an increase in a Curie temperature and an increase in a maximum energy product, thereby realizing a reduction in size and weight of a magnetic circuit.

Example 4

In the present example, a reactive aging treatment was performed in a process of producing a sintered magnet. As the sintered body constituting the main phase of the sintered magnet, $(Nd,Sm)_2Fe_{14}B$ was prepared. The sintered body was placed in an introduction chamber of a carburizing furnace having the same configuration as in Example 1, and the introduction chamber was vacuum-evacuated. An ultimate vacuum of the carburizing furnace is $5\times10^{-4}$ Pa. After the vacuum-evacuation, an inside of the furnace was substituted with Ar gas to exhaust residual oxygen and residual steam. The temperature in the treatment chamber was raised in advance and controlled to be in a range of 650° C.±5° C. in a soaking zone. A heating rate was 10° C./sec. When the inside of the treatment chamber reached 650° C., $C_2H_2$ and Ar gas were each caused to flow in a pulse shape. A time for flowing $C_2H_2$ was divided into a pulse-shaped time. $C_2H_2$ was caused to flow for 1 minute, then stopped for 2 minutes, and only Ar was caused to flow. Next, $C_2H_2$ was caused to flow for 1 minute, and only Ar was caused to flow again for 5 minutes. Finally, after $C_2H_2$ was caused to flow for 1 minute, the sintered body was moved to the cooling chamber and cooled by spraying Ar. A maximum cooling rate was 10° C./sec to 20° C./sec.

After cooling the sintered body to 300° C. or lower, the sintered body was heated to 500° C. using the same vacuum equipment as above, $NH_3$ was introduced, held for 2 hours (reactive aging treatment), and then rapidly cooled with $N_2$ gas. The sintered body was magnetized in the easy magnetization direction at a magnetic field of 40 kOe to produce the sintered magnet according to Example 4.

In the present example, carbon is diffused along the grain boundary at 650° C. initially, and further nitrogen is diffused during the aging treatment. It was confirmed that, by forming a concentration gradient of nitrogen after forming a concentration gradient of carbon, the maximum energy product was improved (before the diffusion step: 40 MGOe, after the diffusion step: 48 MGOe) and the Curie point was increased (before the diffusion step: 310° C., after the diffusion step: 380° C.)

It is considered that this effect is obtained because a compound, having a smaller rare-earth element concentration and a higher Curie temperature boundary than those of a 2-14-based compound such as $(Nd,Sm)_2Fe_{17}(N,C)_3$, is formed in the vicinity of the grain boundary.

Example 5

In the present example, $Nd_2Fe_{14}B$ was prepared as the sintered body constituting the main phase of the sintered magnet, and copper acetylide was coated to the surface of the sintered body. A thickness of the coating film is 10 μm. The sintered body coated with copper acetylide was placed in an introduction chamber of a carburizing furnace having the same configuration as in Example 1, and the introduction chamber was vacuum-evacuated. An ultimate vacuum of the carburizing furnace is $1\times10^{-4}$ Pa. After the vacuum-evacuation, an inside of the furnace was substituted with Ar gas to exhaust residual oxygen and residual steam. A temperature in the treatment chamber was raised in advance and controlled to be in a range of 700° C.±5° C. in a soaking zone. A heating rate was 5° C./sec. When an inside of the treatment chamber reached 700° C., $C_2H_2$ and Ar gas were each caused to flow in a pulse shape. A time for flowing $C_2H_2$ was divided into a pulse-shaped time. $C_2H_2$ was caused to flow for 3 minute, then stopped for 3 minutes, and only Ar was caused to flow. Next, $C_2H_2$ was caused to flow for 3 minutes, and only Ar was caused to flow again for 3 minutes. Supply of $C_2H_2$ for 3 minutes and supply of Ar for 3 minutes were repeated three times, and finally, after $C_2H_2$ was caused to flow for 1 minute, the sintered body was moved to the cooling chamber and cooled by spraying Ar. A maximum cooling rate was 10° C./sec to 20° C./sec.

After cooling the sintered body to 100° C. or lower, the sintered body was heated to 500° C. using the same vacuum equipment as above, held for 2 hours, and then rapidly cooled with Ar gas. The sintered body was magnetized in the easy magnetization direction at a magnetic field of 40 kOe to produce the sintered magnet according to Example 5.

It is necessary to select an optimum carburizing treatment temperature of the present example depending on the composition of the liquid phase, that is, the composition of the sintered magnet. In the present example, a temperature of 700° C. was used. When a formation temperature of the liquid phase is 500° C., the treatment temperature can also be set at 500° C. or higher. When the formation temperature of the liquid phase is in a temperature range of 400° C. to 800° C., copper can be diffused into the grain boundary together with carbon or nitrogen. When the treatment temperature is higher than 800° C., an amount of the liquid phase is increased and a diffusion coefficient is also increased, so that the carbon concentration in the center of the grain boundary is increased, the width from the center of the grain boundary of the carbon-substituted phase along the grain boundary is increased, and the rare-earth carbide is likely to grow. Therefore, the concentration of the rare-earth element in the main phase is reduced, and the soft magnetic component is likely to grow.

In the present example, it was confirmed that copper and carbon were diffused to the grain boundary, and regarding magnetic properties, the maximum energy product was increased from 52 MGOe to 65 MGOe. By increasing the maximum energy product, the volume of the sintered magnet used in the magnetic circuit can be reduced.

As described above, according to the invention, it is possible to provide the sintered magnet having an improved maximum energy product while maintaining a coercive force of the magnet and the method for producing a sintered magnet.

The invention is not limited to the above examples, and includes various modifications. For example, the above-described examples are described in detail for easy understanding of the invention, and the invention is not necessarily limited to those including all the configurations described above. A part of the configuration of one example can be replaced with the configuration of another example, and the configuration of another example can be added to the configuration of one example. Further, a part of the configuration of each example may be added to, deleted from, or replaced with another configuration.

REFERENCE SIGN LIST

10*a*, 10*b* sintered magnet
1 diffusion layer

2 main phase
3 grain boundary triple point
4 grain boundary
5 surface layer
6, 7 grain

The invention claimed is:

1. A sintered magnet, comprising:

a grain including:

a main phase containing, as a main component, a compound containing a rare-earth element, iron and boron, and a diffusion layer provided on a surface of the main phase, wherein the diffusion layer contains, as a main component, a compound in which a part of the boron constituting the compound of the main phase is substituted with at least one of carbon and nitrogen, a concentration of the at least one of the carbon and the nitrogen in the diffusion layer is higher than that in the main phase, the at least one of the carbon and the nitrogen exhibits a concentration gradient from a surface toward an interior of the grain, and a ratio X/Y of a concentration X of at least one of the carbon and the nitrogen to a concentration Y of the boron in the diffusion layer is 0.1 or more and 10 or less based on an atomic mass.

2. The sintered magnet according to claim 1, wherein the at least one of the carbon or the nitrogen exhibits a concentration gradient from the surface to the interior of the sintered magnet.

3. The sintered magnet according to claim 1, wherein a surface layer containing, as a main component, a compound having a concentration of the rare-earth element with respect to the iron lower than that of the compound of the main phase is provided on a surface of the diffusion layer.

4. The sintered magnet according to claim 1, wherein a heavy rare-earth element is unevenly distributed in a vicinity of a grain boundary of the grains.

5. The sintered magnet according to claim 1, wherein the main phase is $R_2Fe_{14}B$, an $R_2Fe_{17}$-based compound or an $RFe_{12}$-based compound (R is a rare-earth element).

6. The sintered magnet according to claim 1, wherein a thickness of the diffusion layer is 1 nm or more and 500 nm or less.

7. The sintered magnet according to claim 1, wherein the at least one of the carbon and the nitrogen in the diffusion layer has a concentration of 2 at % to 10 at %.

* * * * *